Sept. 27, 1938.                D. B. GARDNER                 2,131,504
                      SOLID WEAVE SCANNING APPARATUS
                          Filed Dec. 6, 1935            2 Sheets-Sheet 1

*Transmitting Set.*

Inventor.
Delamere B. Gardner.
By
William M. Gentle
His Attorney.

Sept. 27, 1938.　　　　D. B. GARDNER　　　　2,131,504
SOLID WEAVE SCANNING APPARATUS
Filed Dec. 6, 1935　　　2 Sheets-Sheet 2
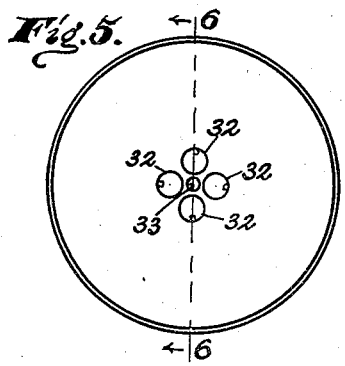
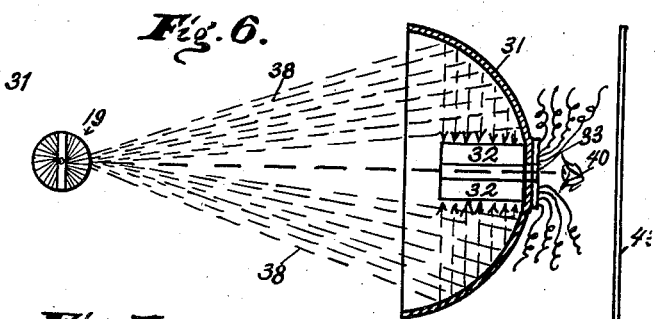
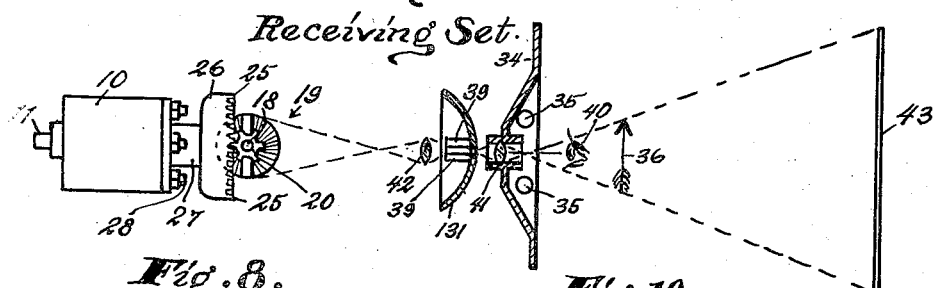
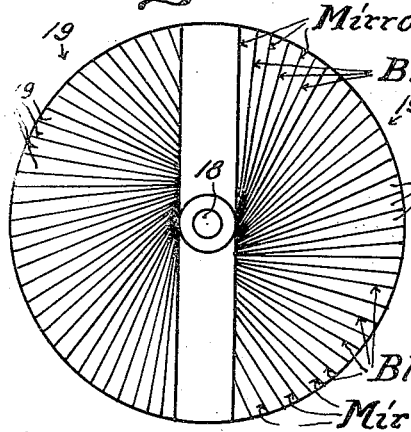
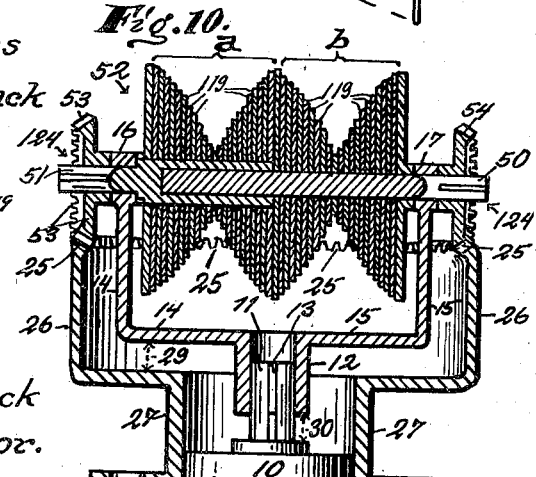
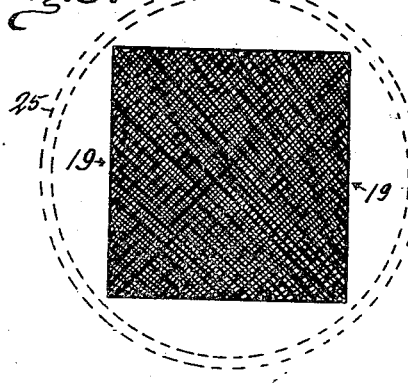
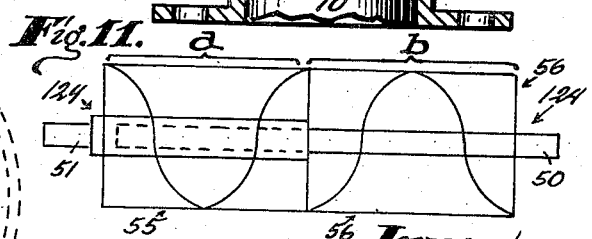
Inventor.
Delamere B. Gardner.
By William M. Gentle
His Attorney.

Patented Sept. 27, 1938

2,131,504

UNITED STATES PATENT OFFICE 2,131,504

SOLID WEAVE SCANNING APPARATUS

Delamere B. Gardner, Los Angeles, Calif.

Application December 6, 1935, Serial No. 54,700

12 Claims. (Cl. 178—7.6)

This invention relates to means for scanning in picture-taking, reproduction, transmission and the like, and has for its principal object the provision of a weave scanning apparatus designed to increase the efficiency, scope and usefulness of the reflecting and scanning apparatus disclosed in my United States Letters Patent No. 1,753,697, issued to me April 8, 1930.

Another object of this invention is to provide a weave scanning apparatus in which a ratio between one motion and another at different speeds can be maintained indefinitely with the scanning points continuuosly changed as to direction.

Heretofore, scanning has been accomplished in spiral lines of dots or lines of dots vertical and horizontal, but in this apparatus the directions of the lines of dots are continually changing so they appear in photographs to be woven together. To that end I mount the shaft of my helical mirror in a bracket that is integral with a hollow spindle mounted on the shaft of a motor. A hollow cylindrical bracket is secured to the motor so that the stationary orbit gear on its free open end is concentric with the motor shaft; and secured to the mirror shaft is a pinion that meshes with said orbit gear so that when the motor is driven two distinct motions will be imparted to the helical mirror, one a rotation on its axis, and the other a spinning of the mirror on its cross center axis.

It is understood that the rotating of the mirror on its axis can be either faster or slower than the spinning motion and in some instances the ratio may be either odd or even. When the gear ratio is even, the sequences of scanning will be uniform; and when the gear ratio is odd there will be a continuous change in the sequences of scanning.

Another object of this invention is to provide a simple means for scanning scenes and images so they can be transmitted and received. To that end my scanning apparatus is constructed so scenes and images can be scanned; and detail not picked up in the first sweep of scanning will be covered by succeeding sweeps.

In other words, my scanning apparatus is constructed so that the ends of the mirror shaft move in an orbit as the shaft rotates on its axis, thereby moving the line-like mirrors each in its respective spiral course so that each dot size space in the field of vision will be picked up by the weave scanning apparatus.

A feature of invention is shown in providing a reflector to function with my scanning apparatus that is provided with a group of photo-electric cells arranged in the focus of its zone of the reflecting surface.

The change from transmission to reception layout is accomplished by substituting glow-lamps or glow-bars for the photo cells local points of the reflectors. It is obvious that photo-cells or glow tubes may be used without reflectors or condensers or the interposition of any optical device.

A feature of invention is shown in using a staggered helical mirror with alternately light and black units and with the mirror edges of one mirror staggered relative to the mirror edges of the other, which, when used in my new apparatus for imparting both a rotary and orbit movement to the helical mirror is very effective in scanning in complete detail.

A feature of invention is shown in constructing the apparatus so a change of gear ratio can be made to automatically increase the number of scanning lines per revolution of the motor shaft.

Another feature of invention is shown in mounting two helical mirrors end to end and rotating them in opposite directions and simultaneously spinning them around a center axis. Also a feature of invention is shown in forming a helical mirror of two equal parts that can be rotated in opposite directions and simultaneously spinning them around a center axis.

Other objects, advantages and features of invention may appear from the accompanying drawings and detailed description thereof.

The accompanying drawings illustrate my invention, in which:

Fig. 2 is a face view of my weave scanning apparatus as viewed from line 2—2, Fig. 1, with the apparatus shown on a larger scale.

Fig. 3 is a fragmental view analogous to that shown in Fig. 1 with the apparatus turned to a vertical position.

Fig. 4 is a section on line 4—4, Fig. 3, showing the detailed construction of the gear mechanism for imparting a double motion to my weave scanning apparatus.

Fig. 5 is a front view of the reflector as viewed from line 5—5, Fig. 1.

Fig. 6 is a section on line 6—6, Fig. 5, diagrammatically indicating how the lines of light impulses are reflected from the weave scanning apparatus to the photo-electric cells.

Fig. 7 is a view analogous to Fig. 1 with parts arranged for reception.

Fig. 8 is an end view of a helical mirror with staggered reflecting units.

Fig. 9 is a diagrammatic view of the face of my scanning apparatus indicating the direction the scanning lines will approximately take when the apparatus is actuated slowly in one spinning revolution and four revolutions of the apparatus.

Fig. 10 is a sectional view analogous to Fig. 4, parts being omitted showing a helical mirror in section mounted on a two-piece shaft, with one part of the mirror on one part of the shaft and the other part of the mirror on the other part of the shaft mounted and driven so the two parts of the mirror will rotate in opposite directions.

Fig. 11 is a diagrammatic view analogous to Fig. 10 showing two helical mirrors on the two-piece shaft arranged end to end and driven to rotate in opposite directions.

Figure 1:
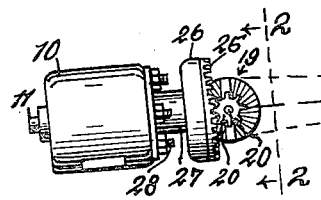
Fig. 1 is a side elevation of my weave scanning apparatus in use in a transmitting set, parts indicated diagrammatically and other parts shown in section.
Figure 1:
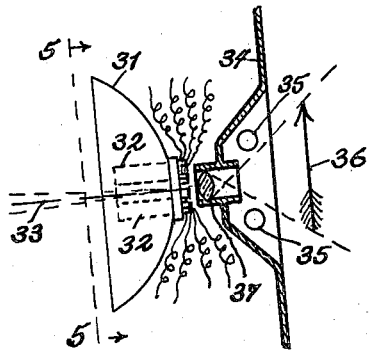
Figure 1:
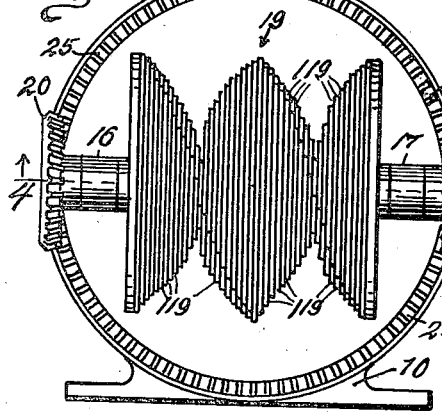
Figure 1:
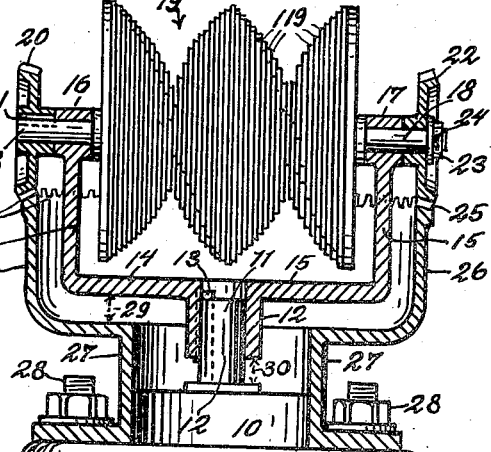
Figure 1:
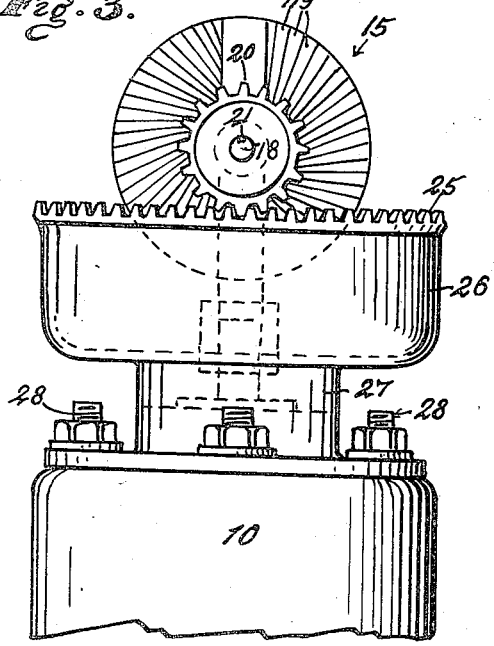
Figure 1:
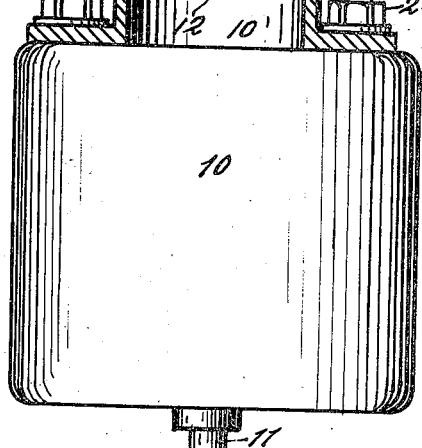

In detail my weave scanning apparatus includes a motor 10 having a shaft 11 to which a hollow spindle 12 is secured by a key 13 so they rotate together when the motor is driven. It is understood that the spindle need not be hollow and also that it can be rotated by any other suitable means.

Arms 14 and 15 have their inner ends integral with said spindle, and they are arranged opposite to one another and are first extended outwardly transversely from said shaft a predetermined distance and are then bent at a right angle so they extend parallel with one another and with said shaft, and the free ends of these arms terminate in the bearings 16 and 17. These bearings are shown semidiagrammatically in the drawings, it being understood that any suitable roller or ball bearings can be used to support the shaft 18.

Secured to the shaft 18 central to the longitudinal axis of the motor shaft is a scanning apparatus 19, the detailed construction of which is very clearly and fully described in my prior patent hereinbefore mentioned.

Units 119 each have a line-like mirror with its other edges and ends blackened so that when the helical mirror is rotated each line-like mirror is turned into position to perform its function.

The ends of the shaft 18 are extended beyond the bearings 16, 17 and a pinion 20 is secured by a key 21 to one end of the shaft and an idler pinion 22 is loosely mounted on the other end of said shaft.

The pinion 22 is held in place by a washer 23 and cotter pin 24, it being understood that any well known means can be employed for loosely securing the pinion on the shaft.

The pinion 20 is in mesh with a stationary orbit gear 25 that is preferably on the open end of a cylinder 26 that has its other end contracted and formed integral with a bracket 27 secured by stud bolts 28 to one end of the motor 10 so the gear 25 is held concentric to the longitudinal axis of the motor shaft 11.

The gear and pinion are arranged so the motor when actuated will cause the ends of the shaft 18 to move in an orbit, thereby causing pinion 20 to also be carried in an orbit and simultaneously rotated by the engagement of its teeth with the stationary orbit gear 25, and as previously described the ratio between the gear 25 and pinion 22 can be odd or even, and also these parts are arranged so speed of the scanning apparatus can be increased by substituting smaller pinions for the pinions 20 and 22.

As best shown in Fig. 4, there is a clearance 29 between the arms 14, 15 and the top edge of the bracket 27 and also another clearance 30 between the bottom of the spindle 12 and the end of the motor to permit the arms and spindle to be moved in toward the motor when smaller pinions are to be used on the shaft 18.

With my wave scanning apparatus constructed as described two distinct motions are imparted to the helical mirror 19 when the motor 10 is actuated, one a spinning of the mirror on its center cross axis and the other a rotation caused by the pinion traveling around on the orbit gear 25, which combined motions cause the mirror units of the helix 19 to each trace slightly curving courses across the field in successively dot size spaces, so that on each turn of the helix the field is covered by a sweep of imaginary scanning lines which in reality are a plurality of dot size scanning spaces that are moving in slightly curved line-like courses.

When the ratio of the pinions and gears is 4 to 1 the field will be swept four times or one time for each quarter segment of the orbit gear and for that reason I provide in my transmitting set shown in Fig. 1, a reflector 31 that has four line photo-electric cells 32 arranged in the caustic 33 with the cells connected in well known electric connections so that each picks up the impulses from its respective zone of the reflector.

Arranged close to the back of the reflector is an opaque partition 34 in which lamps 35 are arranged to illuminate the object 36 and reflect its image through the lens 37 to the helical mirror 19 that scans the projected image and transmits the variations of light and shadow from the image to the line photo-electric cells as described.

The impulses from the helical mirror 19 to the reflector 31 and then to the photo-cells are illustrated diagrammatically by lines 38 in Fig. 6.

The receiving set shown in Fig. 7 is substantially like that shown in Fig. 1 except that the reflector 131 is provided with four glow tubes or bars 39 that are modulated by the transmitted electrical impulses of a transmitted image and reflected to the helical mirror 19 so it can be seen by the eye 40 or projected through the lenses 41, 42 to the screen 43.

A modified form of helical mirror is shown in Fig. 8 and, as seen therein, the units are alternated so that every other one is black when viewed from a front or scanning position so that as the mirror turns a line-like mirror will be rotated into the space that was previously black and vice versa. This mirror is not new except as associated with my means for rotating it on a shaft and simultaneously rotating it on its axis.

This weave scanning apparatus is used as hereinbefore fully described.

Another modified form of weave scanning apparatus is shown in Fig. 10 in which a two-part shaft 124 is mounted in the bearings 16 and 17 with the part 50 telescoped into the part 51, and mounted on this shaft is a helical mirror 52 formed of the equal parts *a* and *b* each of which is a half part of a helix made up of units like those shown in my prior patent hereinbefore mentioned.

Similar pinions 53 and 54 are keyed to their respective parts of the shaft 124 so they mesh with the teeth of the gear 25 so that when the motor 10 is driven the parts *a* and *b* of the helical mirror will be rotated in opposite directions and also spin around the longitudinal axis of the motor shaft 11.

In Fig. 11 a diagrammatic view of the shaft 124 is shown supporting a pair of helical mirrors 55 and 56 each of which is composed of line-like mirror units such as shown in my prior patent hereinbefore mentioned. This pair of mirrors are abutted end to end and are driven to rotate in opposite directions and also actuated so they move around the longitudinal axis of the motor shaft 11. It is understood that the shaft shown in Fig. 11 is driven substantially like that shown in Fig. 10.

The modified forms of scanning apparatus shown in Figs. 10 and 11 are used in a manner similar to that shown in Figs. 1 to 7 inclusive.

I claim as my invention:

1. A solid weave scanning apparatus including a helical composite mirrored screen, and means for continuously rotating said screen in two directions perpendicular to each other whereby modulated light is received upon said screen in continuous progressively interwoven curved lines.

2. A solid weave scanning apparatus including a composite mirrored screen, and means for continuously rotating said screen on its longitudinal axis and simultaneously spinning it on its central cross axis whereby modulated light is received upon said screen in continuous progressively interwoven curved lines while scanning in reception and transmission in television.

3. A solid weave scanning apparatus including a helical composite mirrored screen mounted on a shaft, and means for driving said shaft in one direction of rotation and simultaneously spinning it on its center cross axis so the ends of said shaft move in an orbit while scanning in reception and transmission.

4. A solid weave scanning apparatus including a helical composite mirrored screen mounted on a shaft, and means for rotating said shaft at high speed in one direction of rotation and spinning it on its center cross axis at a slower speed so the ends of said shaft are moved in an orbit while scanning in reception and transmission.

5. A solid weave scanning apparatus including a composite mirrored screen formed of a plurality of rectangular units secured side by side, each unit having a line-like mirror edge arranged in the form of a helix, means for preventing the other edges and ends of said units from reflecting light, and other means for rotating said mirror on its longitudinal axis at high speed and spinning it on its center cross axis at an increased speed.

6. A solid weave scanning apparatus including a composite helical mirrored screen, and means for imparting two continuous rotatory motions to said screen to scan a scene and maintain a predetermined ratio between said motions.

7. A weave scanning apparatus including a pair of helical mirrors arranged end to end on a common axis, and means for rotating said mirrors in opposite directions.

8. A solid weave scanning apparatus including a pair of helical mirrors arranged end to end, a shaft on which said mirrors are mounted, means for driving said shaft so said mirrors are rotated in opposite directions and also actuating said shaft so its ends move in an orbit to spin said mirrors around the center cross axis of said shaft.

9. A solid weave scanning apparatus comprising a composite helical mirrored screen made in half parts abutted end to end on a common axis, and means for rotating said parts on the common axis in opposite directions.

10. A solid weave scanning apparatus comprising a screen composed of a plurality of rectangular units arranged side by side on a common axis, the reflector edges of said units being arranged angularly one to another in a predetermined order to form a helix, means for continuously rotating said screen on its axis, and means for simultaneously rotating the screen in its central cross axis.

11. In a solid weave scanning apparatus, a shaft, a plurality of rectangular reflecting units arranged side by side on said shaft, the reflector edges of said units being positioned angularly one to another in a predetermined order to form a helical screen, a fork in which said shaft is rotatable, a crown gear encompassing said screen in a plane parallel with said shaft, a gear on said shaft in mesh with said crown gear and having an odd number of teeth relative to the number of crown gear teeth, and means for revolving said fork on the central cross axis of said screen.

12. A solid weave scanning apparatus comprising a screen composed of a plurality of rectangular units arranged side by side on a common axis, the reflector edges of said units being arranged angularly one to another in a predetermined order to form two helixes, means for continuously rotating said helixes in opposite directions, and means for simultaneously rotating the screen on its central cross axis.

DELAMERE B. GARDNER.